No. 771,932. PATENTED OCT. 11, 1904.
W. H. PRATT.
ALTERNATING CURRENT METER.
APPLICATION FILED MAR. 3, 1903.
NO MODEL.

Witnesses.
J. Ellis Glenn.
Helen Orford

Inventor.
William H. Pratt.
by Albert S. Davis
Atty.

No. 771,932.

Patented October 11, 1904.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ALTERNATING-CURRENT METER.

SPECIFICATION forming part of Letters Patent No. 771,932, dated October 11, 1904.

Application filed March 3, 1903. Serial No. 145,932. (No model.)

*To all whom it may concern:*

Be it known that I, WILLIAM H. PRATT, a citizen of the United States, residing at Lynn, county of Essex, State of Massachusetts, have invented certain new and useful Improvements in Alternating-Current Meters, of which the following is a specification.

My invention relates to certain improvements in electric meters, and more particularly in alternating-current meters of the induction type.

The features of novelty which characterize my invention I have pointed out with particularity in the appended claims, while the invention itself as exemplified by one of the numerous embodiments of which it is capable I have set forth as to detail and mode of operation in the following specification, which is to be taken in connection with the accompanying drawings, in which—

Figure 1:
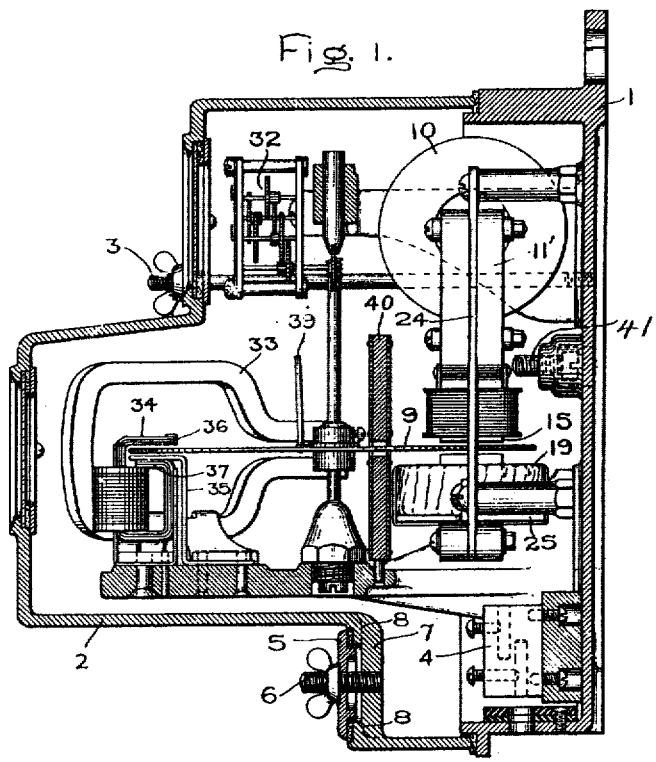
Figure 3:
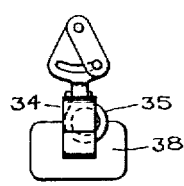
Figure 2:
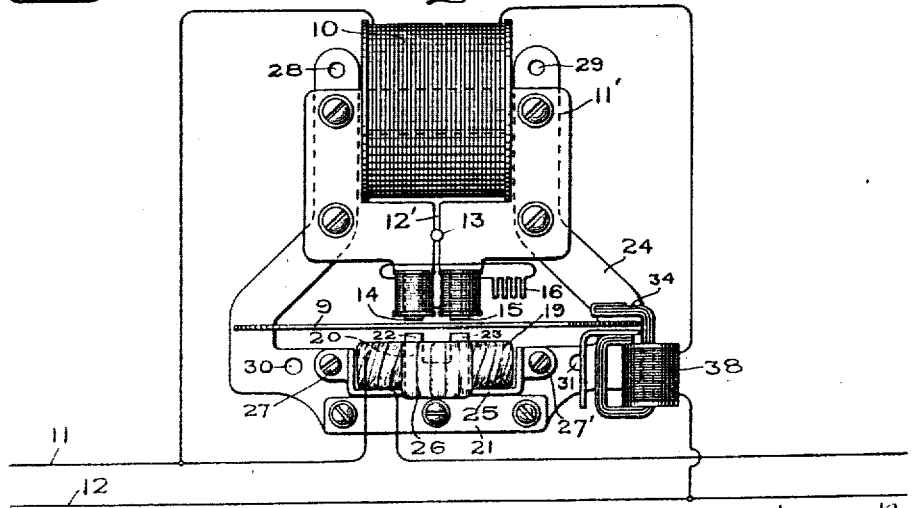

Figure 1 is a view, partly in cross-section, of a meter embodying my invention; Fig. 2, a view of a part of the meter shown in end elevation in Fig. 1, and Fig. 3 a plan view of a detail shown in side elevation in Fig. 1.

In Fig. 1 the frame or casing for supporting the working parts of the meter is indicated at 1. The cover for inclosing the working parts of the meter is indicated at 2 and is held in position by any suitable means—as, for example, by clamping-bolts, such as 3. The binding-posts or other securing devices for the conductors leading into the meter are secured to the frame or casing 1, as indicated at 4, and access may be had to these conductors without removing the cover 2. This access is afforded by an opening in the cover 2, which opening is closed by a plate 5, held in position by the clamping-screw 6, one end of which passes through a rib 7, extending across the opening for which the plate 5 serves as a cover. The walls of this opening are indicated so far as may be by dotted lines at 8.

The motive element acts upon the rotating disk 9, constituting the movable member of the meter, by means of a combination of magnetic fluxes due to the load-current and the potential-current of the meter. The flux due to the potential-current is produced by means of a potential-coil 10, connected in shunt with the mains 11 12 of the system in which energy is to be measured by the meter. This potential-coil 10 is mounted upon a core of magnetic material 11', having a magnetic circuit, which would be completely closed except for a small slot or air-gap 12'. The limbs of the magnetic core are preserved in fixed relation to each other by means of a pin 13 of some non-magnetic material—such, for example, as German silver—driven between the walls of the slot, as indicated. The slot is thus prevented from closing up or otherwise altering its dimensions under the influence of magnetic or any other stress to which the core may be submitted in practice. The core is provided with two polar projections 14 15, located, respectively, on either side of the air-gap 12, as indicated. These polar projections are provided with phase-adjusting windings in which secondary currents are induced by the action of the magnetomotive force of the potential-winding 10. The windings may be connected in series with each other in a closed circuit. An adjustable resistance or resistances—such, for example, at 16—is employed to adjust the currents flowing in the phase-adjusting windings.

The meter is provided in the present instance with a single-current coil. (Indicated at 19.) This current-coil has an inverted-T-shaped magnetic core, the vertical limb of which is indicated in dotted lines at 20 and the horizontal member at 21. The current-coil is placed about the vertical limb of the core, as indicated. This vertical part of the core is provided with two polar projections 22 and 23, arranged opposite the polar projections 14 and 15 of the core of the potential-coil. These polar projections on the core of the current-coil are provided so that the flux may be uniform in distribution between the cores of the potential and current coils, so that the constant of the meter will not be changed by a shifting of the disk toward one core or the other. The two cores above described are supported on a skeleton framework 24, which is sandwiched in with the laminations of the respective cores, as indicated clearly in Fig. 1. From an inspection of this figure it will be seen that for each core one half of the laminations are placed on one side of the skeleton support and the other half on the other side, the parts being then secured together by bolts or screws.

For the purpose of holding the current-coil 19 in position it is first secured to a plate 25 by means of bands of tape, as at 26, passing around the coil, through the opening therein, and through the opening in the plate where it fits over its core. The plate 25, carrying the current-coil, is then fastened to the skeleton support 24 by means of screws 27 27′, passing through ears formed integral with the plate. It is of course evident, however, that the support for the current-coil may be otherwise secured, if desired.

The motive member of the meter above described is screwed or otherwise fastened to posts or projections on the frame or casing 1 of the meter. For this purpose holes are drilled in the skeleton support 24, as indicated at 28, 29, 30, and 31, through which screws are passed into projections formed on the casing 1 of the meter.

The disk 9 of the movable element of the meter rotates within the space between the opposing sets of polar projections on the motor element, and the motion induced by the motor element is communicated in the usual manner to a counter or registering device 32 of any ordinary construction. The usual damping-magnets are employed for producing the required retarding torque for the meter, one of these magnets being shown in Fig. 1 at 33. In practice I generally find it necessary to employ more than one magnet.

In order to overcome the starting friction of the meter and to compensate for the effects of friction at light loads, I make use of a friction-compensating device 34. (Shown in side elevation in Fig. 1 and in plan view in Fig. 3.) As this device possesses no novel features, no special description thereof is necessary other than to state that the slight driving torque required is produced by means of a shifting field due to the distorting effect of a closed-circuit conductor 35, located in an unsymmetrical position in the magnetic field between the pole-pieces 36 and 37 of the core of the exciting-coil 38, which in this instance is placed in series with the main potential-coil 10 of the meter, as clearly indicated in Fig. 2. In order not to obscure the other parts of the drawing, this device 34 is in this figure shown out of the position chosen therefor, as in Fig. 1.

In order to prevent creeping of the meter, I provide a wire 39, of magnetic material, projecting from the disk 9, so that as the disk rotates it moves toward and away from the damping-magnets. The damping-magnets attract the wire with a force which may be adjusted by bending it backward or forward or the like, so as to be just sufficient to prevent the meter from creeping when there is no load on the meter.

In order to prevent interference between the magnetic fields due to the damping-magnets and the magnetic field of the motive element of the meter, I provide a magnetic screen 40, located between the magnets and the motive element, as indicated. The long narrow slot in the screen 40 affords a passage for the rotating disk 9, which projects through the slot and into the space between the opposing pole-pieces of the motive element, as shown.

When the meter is in operation, the main current flowing in the main 11 passes through the current-coil 20 and produces a magnetic flux, which passes through the vertical limb of the magnetic core, through the disk 9, and dividing completes its magnetic circuit through the air to the projecting ends of the horizontal portion 21 of the core. The polar projections 22 and 23 are therefore of the same polarity.

A shunt-circuit across the mains of the system supplies current to the potential-coil 10 of the meter. This current should lag as nearly as possible to ninety degrees from the phase of the impressed electromotive force, this effect being secured by means of the magnetic core 11′. Most of the flux in the core passes across the air-gap 12′; but a certain small proportion is shunted through the polar projections 14 and 15, the magnetic circuit being completed by the opposing polar projections 22 and 23 of the core of the current-coil. The flux thus shunted through the polar projections 14 and 15 is adjusted by means of the closed-circuited coil 16 in a well-understood manner, so that it lags exactly ninety degrees behind the phase of the electromotive force impressed upon the potential-circuit. The flux passing through the disk 9 between the pole-pieces 14 and 22 is the resultant of two fluxes, one in phase with the main current and the other displaced ninety degrees in phase from the impressed electromotive force. The flux between the polar projections 15 and 23 is similarly compounded; but in this instance the potential-flux is of opposite polarity, or, in other words, displaced one hundred and eighty degrees in phase from the potential-flux in the polar projection 14. It will therefore be evident that a shifting field is produced which acts to exert torque upon the disk 9, this torque being proportional to the true energy flowing in the main circuit. Two iron screws, one only of which is shown at 41, extend through the casing 1 toward the core 11′. These screws can be adjusted to assist in preventing creeping by centering the mass of iron electrically with respect to the coils.

In the meter which I have above described it is evident that numerous changes may be made in the form and arrangement of the parts without departing in any essential particular from my invention, for which reason I desire that my claims should not be limited to the details shown nor otherwise than required by the state of the art.

What I claim as new, and desire to secure by Letters Patent of the United States, is—

1. In an electric meter, the combination of a core provided with a potential-coil, a slot or air-gap in the magnetic circuit of said core, polar projections located on said core on either side of the said slot or air-gap, a current-coil having a separate core opposite to the polar projections of the first-named core, and a movable member disposed between said cores.

2. In an electric meter, a potential-coil, a rectangular core therefor having the continuity of one side of the rectangle interrupted by a slot or air-gap, polar projections on said core on either side of said slot or air-gap, a current-coil having a separate core opposite to said polar projections, and a movable member disposed between said cores.

3. In an induction-meter, the combination of a skeleton supporting member, two cores of magnetic material carried thereby, a portion of each of said cores being disposed on either side of said member, a current-coil inductively related to one of said cores, a potential-coil mounted on the other core, and a rotating member arranged within the influence of fluxes developed in both cores.

4. In an induction-meter, the combination of a rotating member, a core having a nearly-closed magnetic circuit, projecting pole-pieces on said core arranged in proximity to one side of said rotating member, a current-coil having pole-pieces or polar projections opposite the first-mentioned core but separated therefrom by said movable member, and means on the first-mentioned core for adjusting the phase of the flux passing therefrom through said movable member.

5. In an induction-meter, a coil, a core therefor having a slot or air-gap in its magnetic circuit, and a pin driven between the walls of said slot so as to prevent alteration of the dimensions of the slot due to magnetic or other force that may be exerted upon the core.

6. In an induction-meter, the combination of a core provided with a potential-coil, a slot or air-gap in the magnetic circuit of said core, polar projections located on said core on either side of said slot or air-gap, a current-coil having a separate core provided with polar projections opposite those on the core of the potential-coil, and a movable member for the meter movable between opposing faces of said polar projections.

7. In an electric meter, the combination of a core provided with a potential-coil, a current-coil provided with a core, and a skeleton supporting device passing through the body of both cores and supporting the same.

8. In an induction-meter, the combination of a potential-coil, a core therefor provided with a slot or air-gap in its magnetic circuit, polar projections on said core located on either side of said slot or air-gap, and means on said polar projections for displacing the phase of the flux therein relatively to the phase of the flux across said slot or air-gap.

9. In an induction-meter, the combination of a potential-coil, a core therefor provided with a slot in its magnetic circuit, polar projections on said core located on either side of said slot, and means on said polar projections constituting the seat of induced currents.

10. In an induction-meter, the combination of a current-coil, a magnetic core therefor having adjacent polar projections of the same polarity, a potential-coil, a core therefor provided with polar projections of opposite polarity arranged opposite the polar projections of the core of the current-coil, and a movable member for the meter arranged within the influence of the flux passing between the sets of polar projections.

In witness whereof I have hereunto set my hand this 28th day of February, 1903.

WILLIAM H. PRATT

Witnesses:
DUGALD McK. McKILLOP,
JOHN A. McMANUS.